(12) United States Patent
Lee et al.

(10) Patent No.: US 10,216,016 B2
(45) Date of Patent: Feb. 26, 2019

(54) LINEAR OPTICAL PHASE MODULATORS

(71) Applicant: Cornell University, Ithaca, NY (US)

(72) Inventors: Yoon Ho Lee, San Diego, CA (US);
Jaime Cardenas, Ithaca, NY (US);
Michal Lipson, Ithaca, NY (US)

(73) Assignee: Cornell University, Ithaca, NY (US)

( * ) Notice: Subject to any disclaimer, the term of this patent is extended or adjusted under 35 U.S.C. 154(b) by 109 days.

(21) Appl. No.: 14/810,444

(22) Filed: Jul. 27, 2015

(65) Prior Publication Data
US 2016/0054596 A1 Feb. 25, 2016

Related U.S. Application Data

(60) Provisional application No. 62/029,399, filed on Jul. 25, 2014.

(51) Int. Cl.
*G02F 1/035* (2006.01)
*G02F 1/025* (2006.01)

(52) U.S. Cl.
CPC .................................. *G02F 1/025* (2013.01)

(58) Field of Classification Search
None
See application file for complete search history.

(56) References Cited

U.S. PATENT DOCUMENTS

| | | | | |
|---|---|---|---|---|
| 2004/0100682 A1* | 5/2004 | Fujiwara | ............... | G02F 1/0121 359/326 |
| 2005/0148107 A1* | 7/2005 | Byun | ...................... | G02F 1/025 438/31 |
| 2014/0341497 A1* | 11/2014 | Liu | ........................ | G02F 1/015 385/3 |

FOREIGN PATENT DOCUMENTS

JP 2014126728 A * 7/2014 ............. G02F 1/025

OTHER PUBLICATIONS

Ayazi, A. et al., "Linearity of silicon ring modulators for analog optical links," Optics Express 20, 13115-13122 (2012).
Bridges, W.B. et al.,"Distortion in Linearized Electrooptic Modulators", Microwave Theory and Techniques, IEEE Transactions on 43, 2184-2197 (1995).
Cardenas, J. et al, "Linearized silicon modulator based on a ring assisted Mach Zehnder inteferometer," Optics Express 21, 22549-22557 (2013).
Chmielak, B. et al., "Pockels effect based fully integrated, strained silicon electro-optic modulator," Optics Express 19, 17212-17219 (2011).
Cox, C.H. et al, "Limits on the performance of RF-over-fiber links and their impact on device design," Microwave Theory and Techniques, IEEE Transactions on 54, 906-920 (2006).
(Continued)

*Primary Examiner* — Chris Chu
(74) *Attorney, Agent, or Firm* — Perkins Coie LLP

(57) ABSTRACT

Methods, systems, and devices are disclosed for linear optical phase modulators. In some aspects, a linear optical phase modulator device is provided to include a substrate; a PN junction formed on the substrate to include a P region, a N region and a depletion region formed by the P and N regions; and an optical waveguide formed on the substrate and structured to guide light in one or more optical modes to have a spatial optical intensity distribution based on a free carrier density spatial distribution in the PN junction in such that the depletion region exhibits a substantially linear response with regard to a voltage applied to the PN junction to modulate a phase of the light guided by the optical waveguide.

7 Claims, 13 Drawing Sheets

(56) References Cited

OTHER PUBLICATIONS

Rasigade, G. et al, "Analytical model for depletion-based silicon modulator simulation," Optics Express 19, 3919-3924 (2011).
Soref, R. et al., "Electrooptical effects in silicon," Quantum Electronics, IEEE Journal of 23, 123-129 (1987).
Watts, M.R. et al, "Low-Voltage, Compact, Depletion-Mode, Silicon Mach Zehnder Modulator," Selected Topics in Quantum Electronics, IEEE Journal of 16, 159-164 (2010).

* cited by examiner

FIG. 3(a)
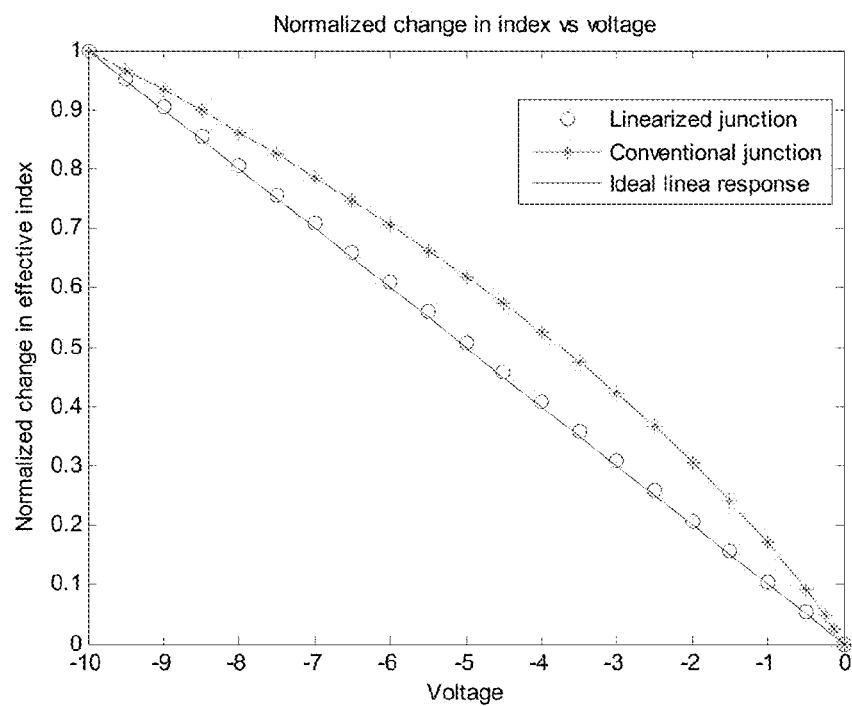
FIG. 3(b)
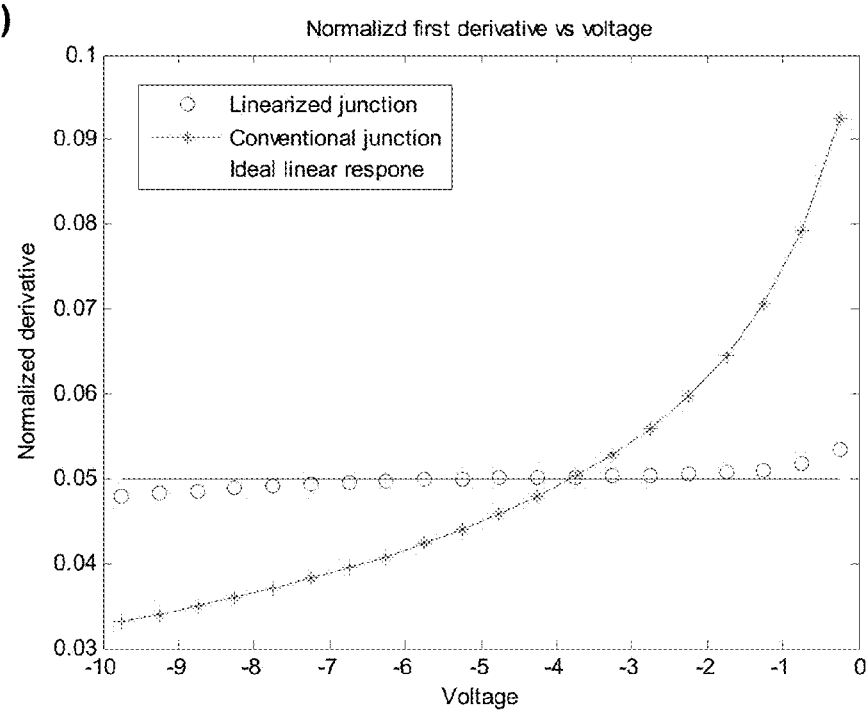
FIG. 3

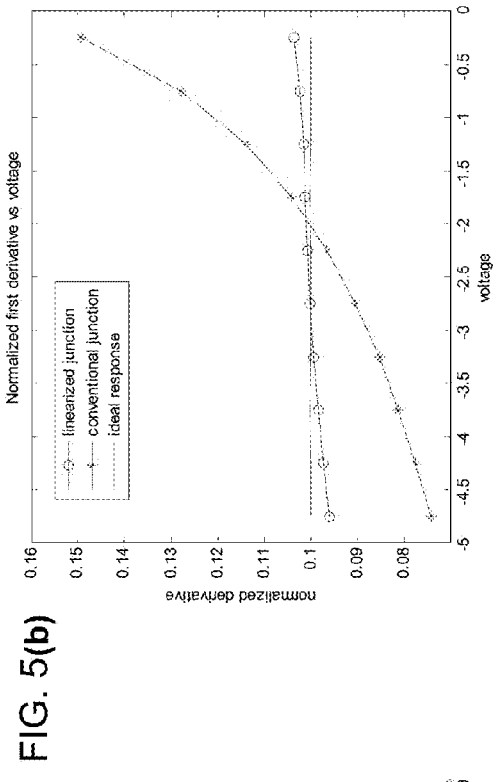
FIG. 5(a)
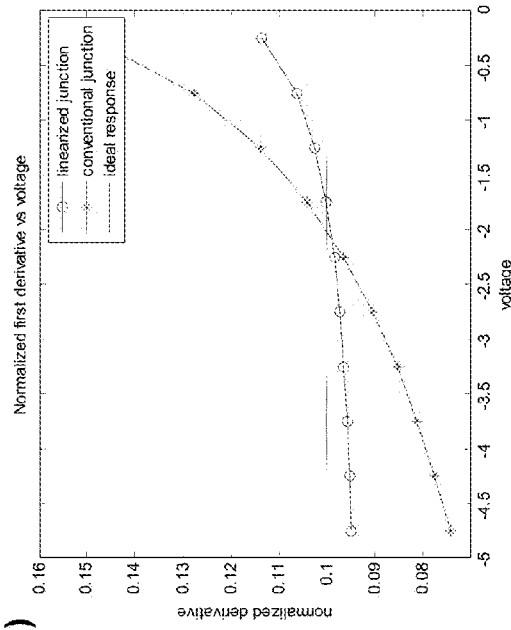
FIG. 5(b)
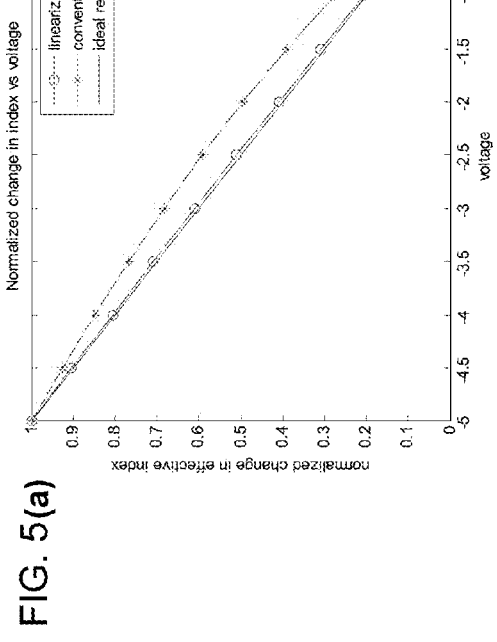
FIG. 5(c)
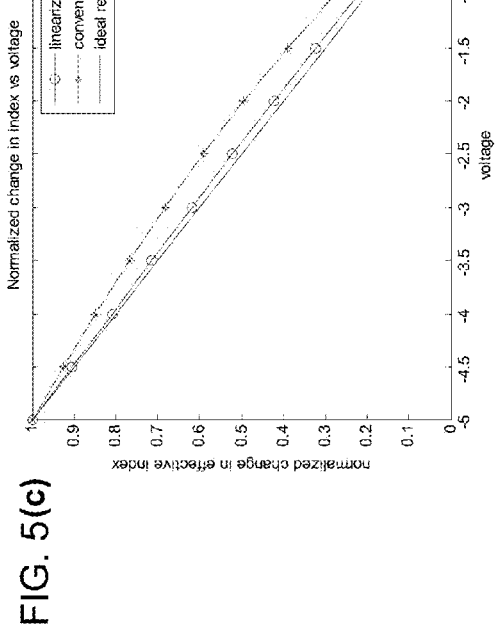
FIG. 5(d)
FIG. 5

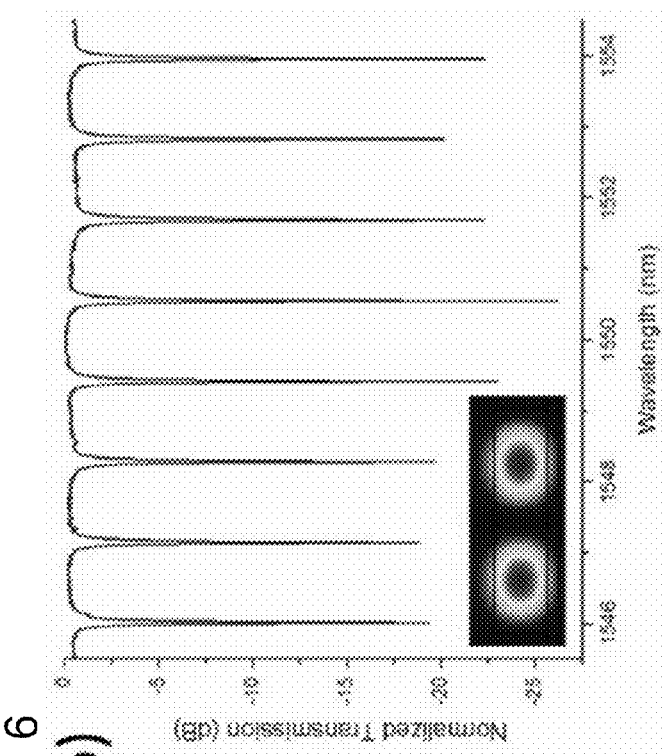
FIG. 6 (b)
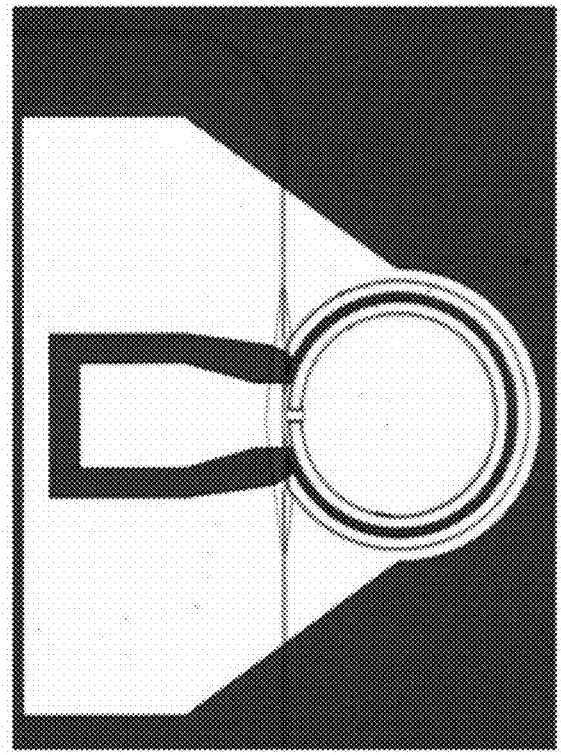
FIG. 6 (a)
FIG. 6

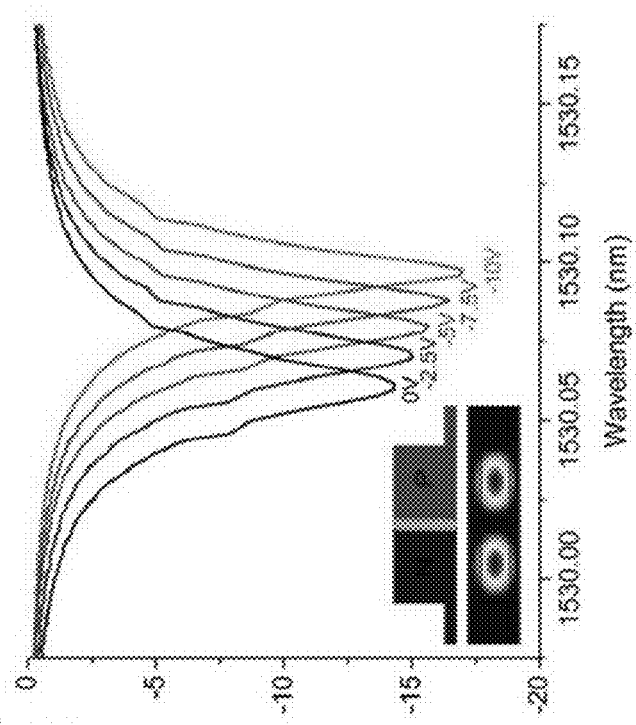
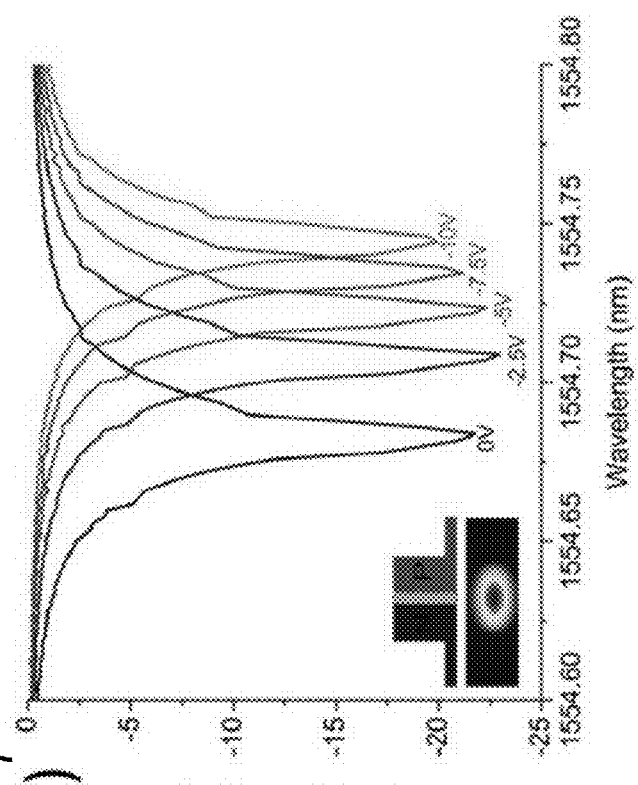
FIG. 7

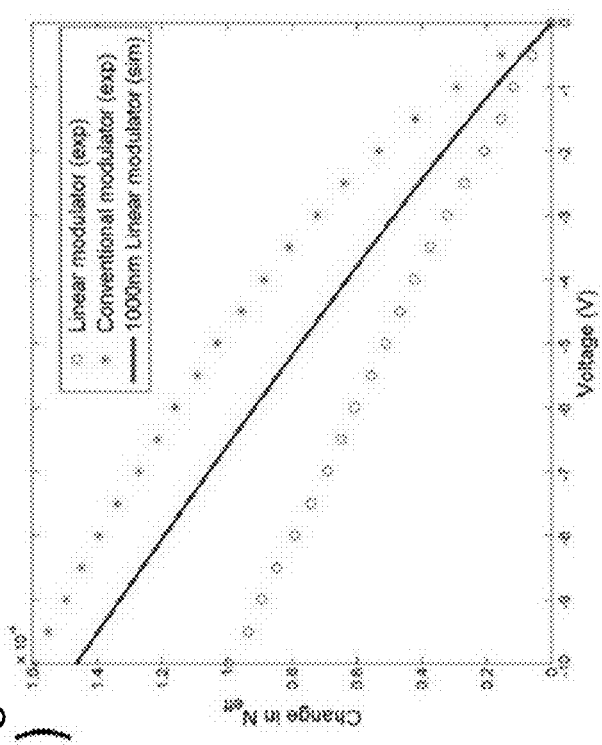
FIG. 8(b)
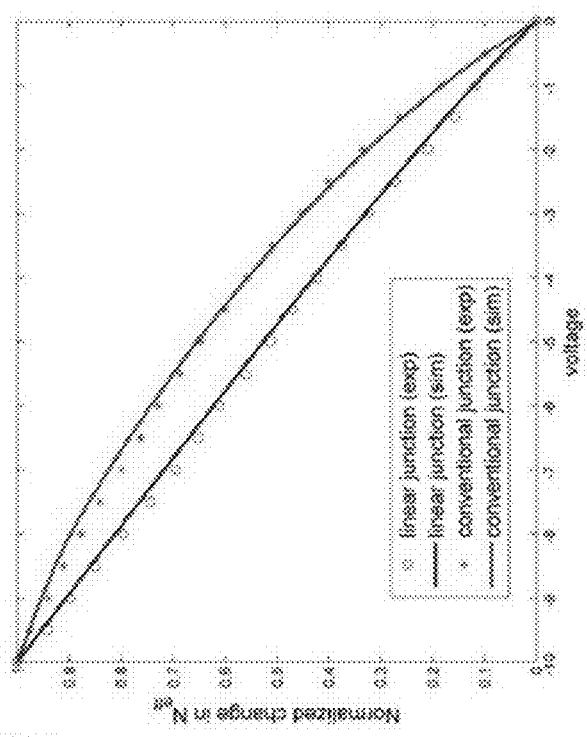
FIG. 8(a)
FIG. 8

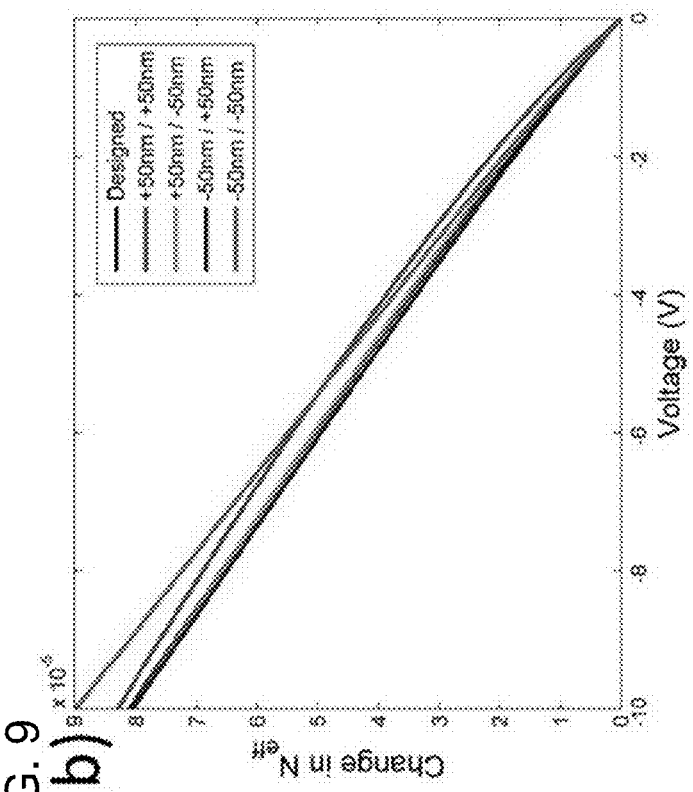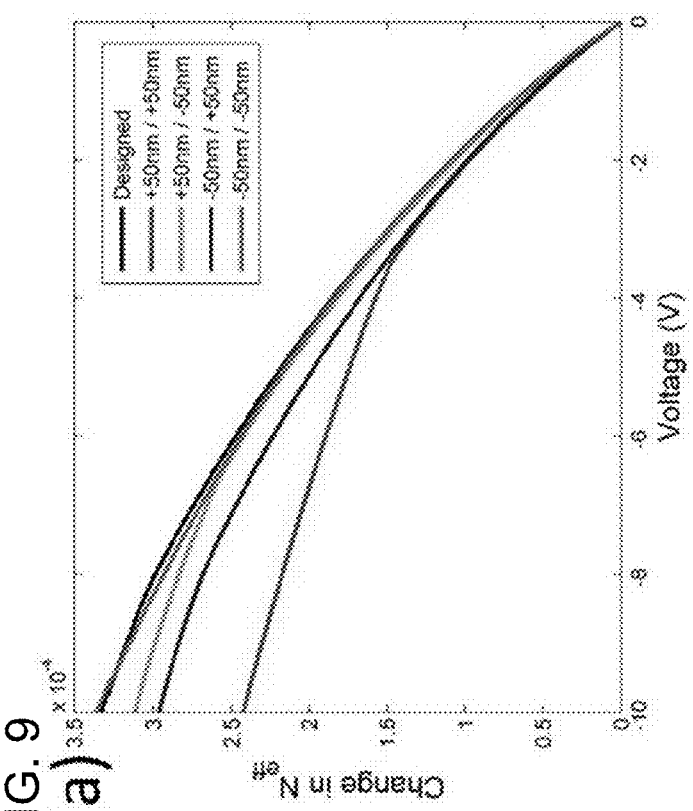
FIG. 9

FIG. 11(a)
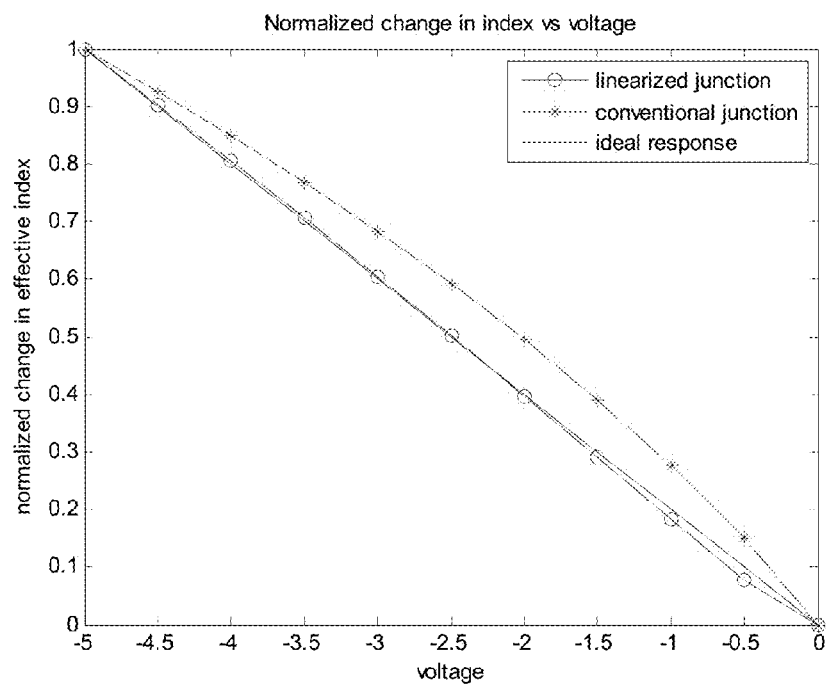
FIG. 11(b)
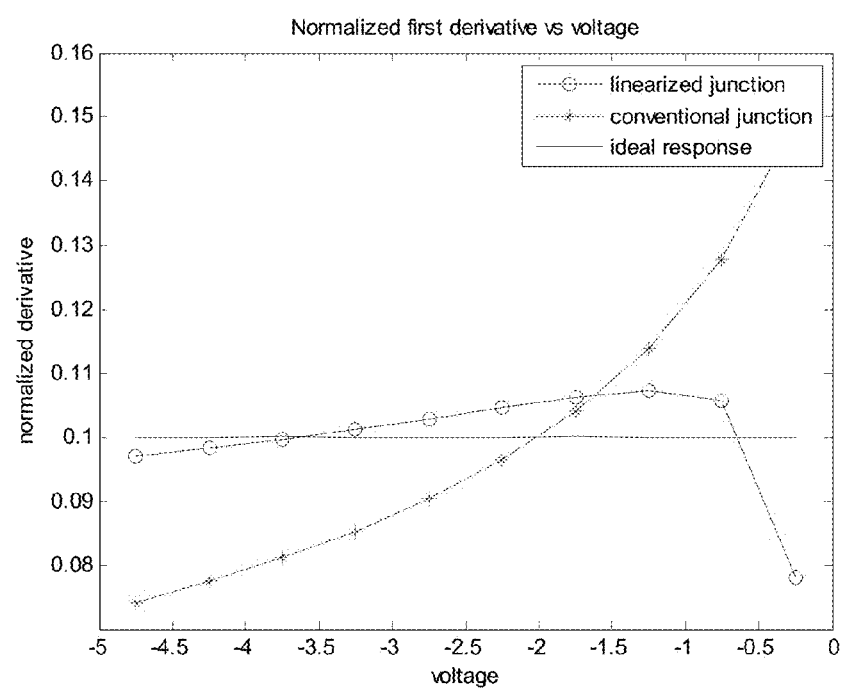
FIG. 11

FIG. 13(a)
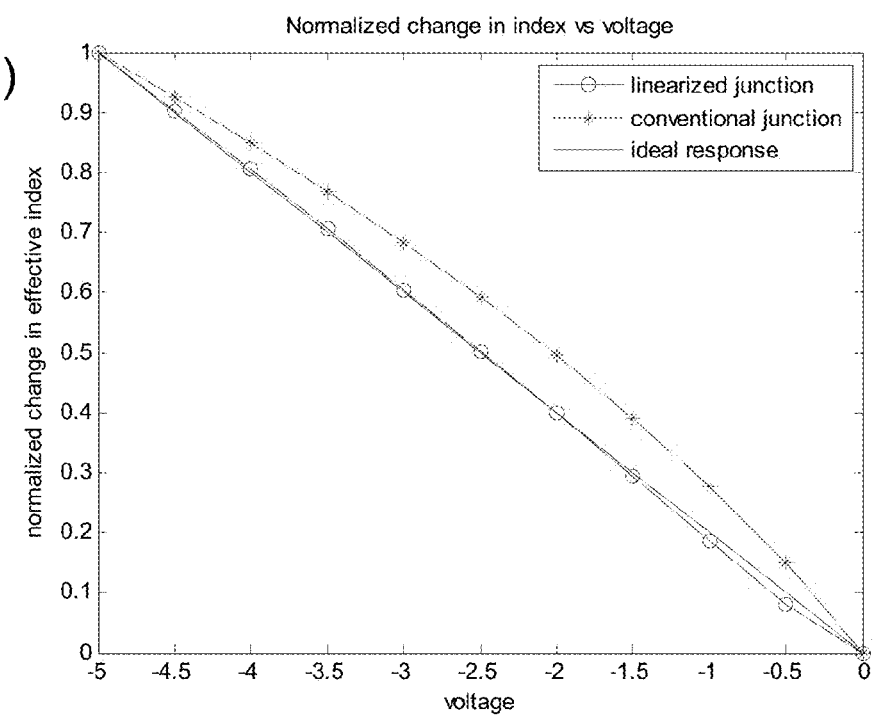
FIG. 13(b)
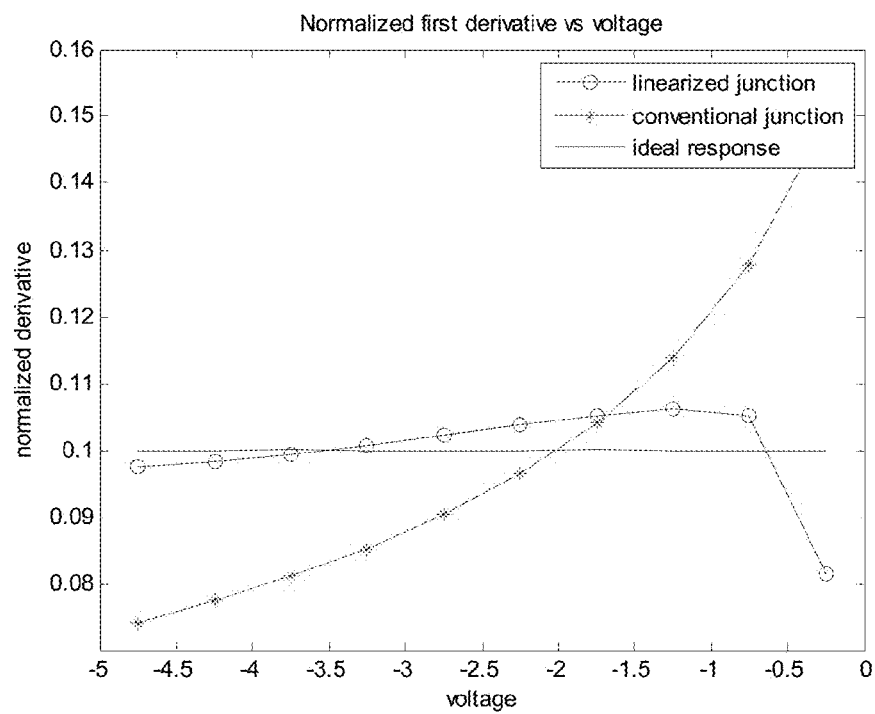
FIG. 13

US 10,216,016 B2

LINEAR OPTICAL PHASE MODULATORS

PRIORITY CLAIM AND RELATED PATENT APPLICATION

This patent document claims priority and the benefits of U.S. Provisional Application No. 62/029,399 entitled "LINEAR OPTICAL PHASE MODULATORS" and filed Jul. 25, 2014, the disclosure of which is incorporated by reference as part of the specification of this document.

STATEMENT REGARDING FEDERALLY SPONSORED RESEARCH OR DEVELOPMENT

This invention was made with government support under grant EEC-0812072 awarded by the National Science Foundation. The government has certain rights in the invention.

TECHNICAL FIELD

This patent document relates to photonic devices.

BACKGROUND

Silicon photonic devices and systems use silicon as an optical medium for generation, emission, transmission, modulation, signal processing, switching, amplification, and detection/sensing of light. In silicon photonic devices, for example, the silicon can be patterned on an insulator (e.g., such as silica) with sub-micrometer precision, into microphotonic components, which can operate in the infrared regime, e.g., at 1.55 µm wavelength.

SUMMARY

Techniques, systems, and devices are disclosed for linear optical phase modulators. In some aspects, devices include structures and circuits for CMOS-compatible silicon-based linear optical phase modulators by using a PN junction-based depletion of carriers to cause optical phase modulation for on-chip data processing and data communications. Due to the relationship between the free carrier spatial distribution in the PN junction region and the voltage applied at the PN junction, there is an inherent nonlinear relationship between the width of the depletion region and the applied voltage at the PN junction for modulating the free carrier density in the phase modulation operation. The disclosed technology provides mechanisms for controlling, shaping or tailoring the optical field spatial distribution of the light to be phase modulated by the PN junction in a way that would reduce the effect of the above inherent nonlinear relationship on the phase modulation operation so that the phase modulation is linear or nearly linear. In effect, the optical field spatial distribution of the light to be phase modulated at the PN junction is selected and optimized to offset the nonlinearity of the above inherent nonlinear relationship.

The disclosed technology enables linear optical phase modulators in silicon photonics platform and other semiconductor based photonics platform using depletion width modulation and/or free carrier dispersion in combination of a tailoring the spatial distribution of the guided light to offset or reduce the nonlinearity between the width of the depletion region and the applied voltage to achieve a linear or substantial linear phase modulation. Exemplary linear optical phase modulator devices of the disclosed technology include an engineered overlap between the depletion width and the optical mode, in which the optical phase response can be linearized with respect to input voltage. In implementations, for example, the disclosed linear optical phase modulator can be used in a Mach Zehnder modulator, among many other configurations, to achieve a more linear voltage to optical transmission transfer function.

The subject matter described in this patent document can be implemented in specific ways that provide one or more of the following features. For example, exemplary highly linear optical modulators in silicon photonics platform can be implemented to achieve high Spurious-Free Dynamic Range (SFDR), which is a key metric in high performance photonic systems for Radio over Fiber (RoF).

In one aspect, a linear optical phase modulator device includes a PN junction formed on the substrate to include a P region, a N region and a depletion region formed by the P and N regions; and an optical waveguide formed on the substrate and structured to guide light in one or more optical modes to have a spatial optical intensity distribution based on a free carrier density spatial distribution in the PN junction such that a voltage applied to the PN junction to modulate a phase of the light guided by the optical waveguide has a substantially linear relationship with the phase of the light.

In some implementations, the optical waveguide has an optical field intensity which increases as distance from the junction increases. In some implementations, the PN junction is located between peeks of an optical field. In some implementations, the optical waveguide has a width of 800 nm to 1500 nm. In some implementations, the optical waveguide is configured to support a second order optical mode to have a first optical peak inside the P region and a second optical peak inside the N region to effectuate a linear phase modulation. In some implementations, the optical waveguide is configured to support a first order optical mode to have an elongated mode distribution along the PNPN junction to effectuate a linear optical phase modulation. In some implementations, the optical waveguide is configured to support a third order optical mode to have three optical peaks located across the waveguide to effectuate a linear phase modulation. In some implementations, the optical waveguide includes an additional PN junction to form a PNPN junction together with the PN junction. In some implementations, the PNPN junction is formed of PN-N-P——PN junction and a concentration of dopants in the P and N regions includes $1 \times 10^{18}$ and a concentration of dopants in the P- and N-regions includes $2 \times 10^{17}$. In some implementations, the linearity of the device depends on a waveguide width and the modulation efficiency of the device depends on doping concentrations of the P region and the N region. In some implementations, the P region and N region include boron and phosphorous.

In one aspect, a linear optical phase modulator device includes a substrate; a PN junction formed on the substrate to include a P region, a N region and a depletion region formed by the P and N regions; and an optical waveguide formed over the substrate and guide light such that the PN junction is placed at a location other than a peak of the optical field to exhibit a linear transfer function between a phase change of the guided light and a voltage applied to the PN junction.

In some implementations, the optical waveguide has a linearity depending on an overlap of the depletion region with an optical mode. In some implementations, the PN junction is placed between peaks of the optical field. In some implementations, the optical waveguide has an additional PN junction placed around the peak of the optical field. In some implementations, the optical waveguide has a width of 800 nm to 1500 nm. In some implementations, the device has a ring shape with bending radius not greater than 80 µm. In some implementations, the linearity of the device depends on a waveguide width and the modulation efficiency of the device depends on doping concentrations of the P region and the N region. In some implementations, the P region and N region include boron and phosphorous. In some implementations, the waveguide is configured to support a first order optical mode or multiple order optical mode.

Those and other aspects and their implementations are described in greater detail in the drawings, the description and the claims.

BRIEF DESCRIPTION OF THE DRAWINGS

FIGS. 3(a) to 3(b) show simulation results of the $2^{nd}$ order mode modulator device of FIG. 2.

FIGS. 5(a) to 5(d) show linearization dependence on doping concentration of an exemplary linear modulator.

FIGS. 6(a) to 6(b) show a die micrograph and transmission spectrum of a ring-shape linear modulator.

FIGS. 7(a) to 7(b) show resonance spectra at different voltage of a ring-shape linear modulator.

FIGS. 8(a) to 8(b) show a normalized change and change in effective index for a conventional modulator and an exemplary linear modulator, respectively.

FIGS. 9(a) to 9(b) show simulated changes in effective index in different misalignment scenarios for a conventional modulator and an exemplary linear modulator, respectively.

FIGS. 11(a) to 11(b) show simulation results of the $1^{st}$ order mode modulator device of FIGS. 8(a) to 8(b).

FIGS. 13(a) to 13(b) show simulation results of the 3rd order mode modulator device of FIG. 10.

DETAILED DESCRIPTION

Figure 1:
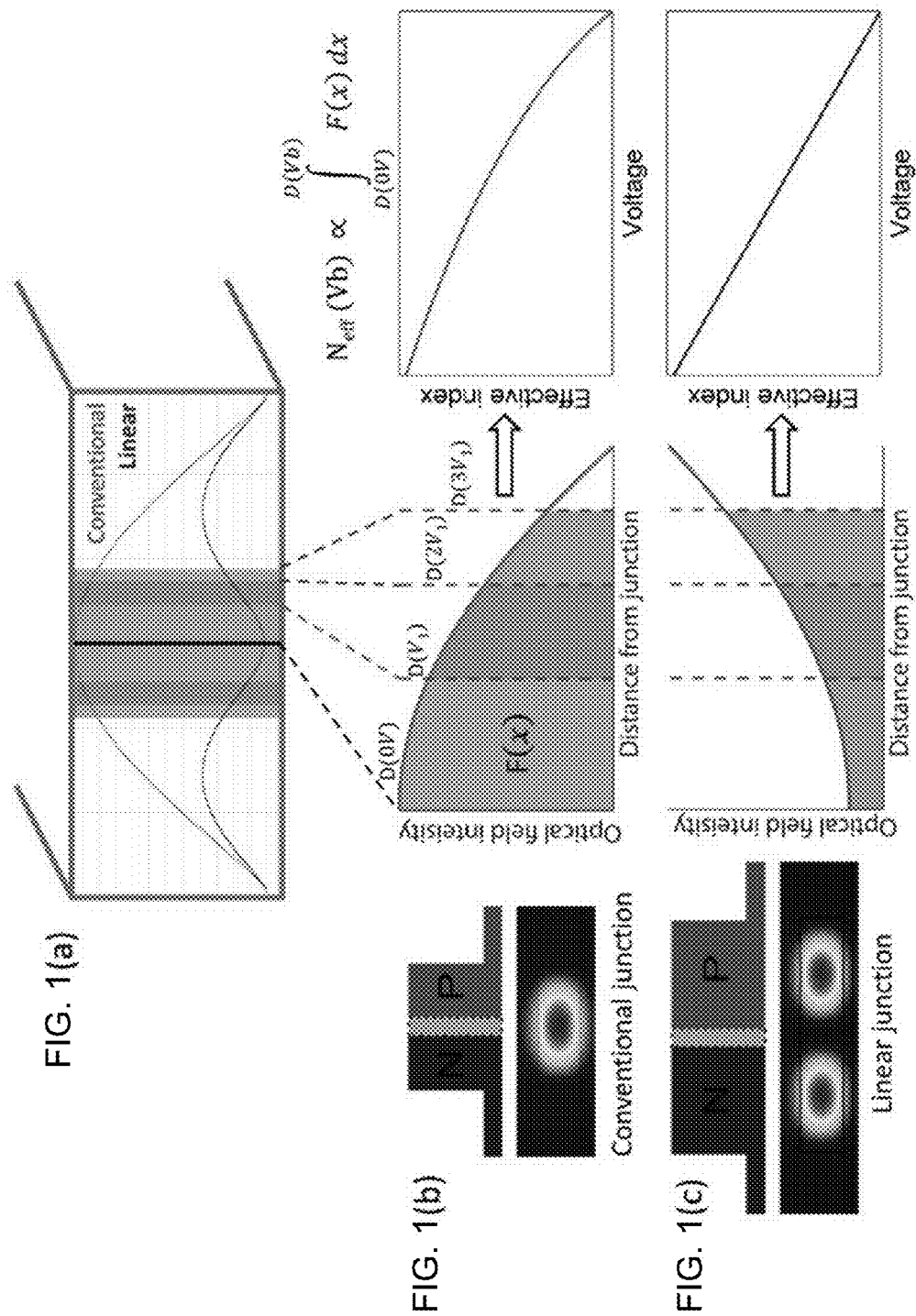
FIGS. 1(a) to 1(c) illustrate a principle of operation of a conventional modulator and an exemplary linear modulator device.

Various implementations of linear optical phase modulators are described below to provide improvements in linearity of modulators.

Silicon photonics (SiPh) promises economic volume manufacturing of high performance photonic devices for many applications, most notably for optical communication. One important subset of optical communication involves transporting analog signals such as in Radio over Fiber (RoF), which imparts Radio Frequency (RF) signals onto optical carrier and sends the RF signal over fiber optical links, taking advantage of the extremely low loss and distortion of fiber optical links in comparison to wireless channels or RF waveguide channels.

One key metric in a RF system, including a RoF system, is the linearity of the entire system's response (transfer function). This linearity, along with the noise floor of the system, dictates the system's Spurious-Free Dynamic Range (SFDR), which determines how much RF power a system can handle before creating detectable distortions, or spurious signals.

One component in a RoF system that limits the SFDR is the modulator that imparts the RF signal onto the optical carrier. The industry standard modulator of choice is the Mach-Zehnder Modulator (MZM), which has two main contributors to its nonlinearity. The first contributor is its nonlinear, Sin(phi)^2 transfer function at quadrature bias with respect to the phase difference (phi) of the two arms of the MZM, which is inherent to the MZM architecture. Sin ^2(phi) function, when expanded using the well-known Taylor expansion around phi=0 gives a linear response for small phi, which the industry has been utilizing. There has been some work done to enhance and expand on and the MZM architecture including use of more complex geometries including ring resonators, and series/parallel combinations of MZMs to further address its inherent nonlinear transfer function. However, the more pressing and fundamental source of nonlinearity for any optical modulators built in SiPh platform, including the MZMs, is the nonlinearity of the phase shifting mechanism that modulates phi, the phase difference between the two arms of the MZM.

In the SiPh platform, the phase shifter in various implementations is typically implemented by utilizing plasma dispersion or the Free-Carrier Dispersion (FCD) effect of silicon as opposed to the linear electro-optic (EO) "Pockels" effect used in industry standard Lithium Niobate ($LiNbO_3$) based MZMs. The Pockels effect is present in only certain materials, and silicon does not have a native Pockels effect due to its intrinsic material characteristics. There have been some demonstration of engineering Pockels effect in silicon using strain engineering, but the effect is quite small, and practical modulator has not been demonstrated using that technology. Linear EO effect is highly desirable for linear modulators because linear EO effect leads to linear phase modulation which in turn leads into more linear total modulator response. However, because silicon does not have the Pockels effect, people have turned to using plasma dispersion or FCD to implement phase shifters.

Plasma dispersion or FCD based phase shifter can be implemented in either carrier injection mode or carrier depletion mode, which refers to injection in forward bias and depletion in reverse bias of free carriers in a silicon PN diode, respectively. The injection or depletion of the free carriers cause both real and imaginary part of the refractive index of silicon to change according to a well-known empirical relation. The change in refractive index profile of the silicon phase shifter leads to a change in phase and amplitude of the optical signal by interacting with the optical mode, where large overlap between change in refractive index and high intensity region of the mode leads to a greater change in phase and amplitude. Injection mode modulators have been thoroughly investigated and found to be limited in speed and high in power consumption leading people to favor use of depletion mode modulator, which inherently operates at higher speed and lower power. However, both injection and depletion based approaches are highly nonlinear in their voltage to phase response, with injection mode having an approximately exponential dependence with respect to voltage, and depletion mode having an approximately square root dependence with respect to voltage. This nonlinearity of the phase shifters in silicon severely limit the linearity of the resulting modulator, posing a major roadblock in implementing high performance RoF systems in SiPh platform.

PN junction-based Depletion Mode (DM) modulator works based on approximately square root voltage dependence of the depletion width around the PN junction when reverse bias is applied. The nonlinear phase dependence of conventional PN junction-based depletion mode modulators on voltage is due to the fundamentally nonlinear, square root dependence of PN junction's depletion region on applied voltage.

FIG. 1 illustrates the principle of operation of modulators based on reverse bias PN junction. In particular, FIG. 1(a) shows optical modes in a waveguide, where TE0 mode is plotted in green and TE1 mode in blue. The colored regions correspond to incremental depletion regions at three different voltages $V_1$, $2V_1$, and $3V_1$. FIG. 1(b) illustrates an operation of a conventional modulator. The PN junction is placed near the peak of the optical field intensity, which leads to the decrease of the area under the curve from one voltage interval to the next. This leads to a nonlinear index-voltage transfer function. FIG. 1(c) shows an exemplary linear modulator engineering an increase in optical field to keep area under the curve constant, achieving linear index-voltage transfer function.

A PN junction has a small depletion region at 0V bias due to the built-in potential as indicated in black in FIG. 1. When a reverse bias of $V_1$ is applied, the depletion region expands (green region), and when $2V_1$ and $3V_1$ are applied (red and blue regions, respectively), the region expands further. The incremental change in the depletion region decreases substantially from the case when $V_1$ (green), $2V_1$ (red), and $3V_1$ (blue) are applied. This is due to square root dependence of the depletion width function ($D(V_b)$) on voltage. It follows that the resulting first derivative of $D(V_b)$ with respect to voltage is negative, which contributes to the negative derivative of the modulator's transfer function.

In one implementation of a PN modulator based on other techniques, the effect of the nonlinear dependence of the depletion region with respect to voltage on the phase response is amplified by the spatial dependence of the optical field intensity. PN junction is typically placed at or near the peak of the optical field (FIG. 1(a), green curve) to maximize the modulation efficiency. Therefore, the optical field intensity F(x) is monotonically decreasing as a function of distance from the junction center (FIG. 1(b), center). Putting it all together, the change in the effective index of an optical mode as a function of voltage is proportional to the overlap integral between the optical field and the depletion region, which is simply the area under the curve between $D(0V)$ and $D(V_b)$. The change in the depletion region decreases from $V_1$ to $2V_1$ to $3V_1$, which in combination with the decreasing optical field intensity results in a clear reduction of the area under the curve between the intervals (FIG. 1(b), shaded in green, red, and blue). This translates to a highly nonlinear change in the effective index that severely limits the linearity of the resulting modulator, posing a major roadblock in implementing high performance analog optical links using the silicon photonics platform.

Within the depletion width, free carriers are "depleted" by the electrical field, which create a corresponding change in the refractive index of the silicon according to aforementioned empirical relation. When this depleted region with its modified refractive index profile interacts with the optical mode, the optical mode experiences a change in the amount of phase it accumulates while propagating through such region, and phase modulation results when the width of the depletion region is dynamically modulated using voltage. Existing DM modulators place the PN junction where the optical field intensity is the highest in order to maximize the overlap integral between the change in depletion width of the PN junction and the optical mode. In a typical single mode waveguide in various implementations, the region with highest optical field intensity is near the center of the waveguide. While such conventional approaches may be good for maximizing the voltage to phase efficiency of the modulator, it results in a nonlinear, square root-like voltage to phase transfer function as expected.

Techniques, systems, and devices are disclosed in this patent document for linear optical phase modulators. The disclosed technology enables linear optical phase modulators in silicon photonics platform and other semiconductor based photonics platform using depletion width modulation and/or free carrier dispersion. Exemplary linear optical phase modulator devices of the disclosed technology include an engineered overlap between the depletion width and a specially tailored optical mode with a desired spatial distribution, in which the optical phase response can be linearized with respect to input voltage. In implementations, for example, the disclosed linear optical phase modulator can be used in a Mach Zehnder modulator, among many other configurations, to achieve a more linear transfer function.

The disclosed approach includes engineering a linear voltage to phase response from a silicon DM optical phase modulator using design and strategic placement of the PN junction with respect to the specially designed optical mode. This approach retains the CMOS compatibility, power efficiency, low swing voltage, and high optical confinement of standard silicon based DM optical modulators while greatly improving the linearity of the resulting phase modulator, which makes it promising for analog photonics applications in the SiPh platform. In addition, the disclosed linearizing approach works for other semiconductors with free carrier dispersion and depletion regions created using PN junction.

The disclosed technology is capable of linearizing the inherently nonlinear voltage to phase response of the Depletion Mode (DM) phase modulator. The present technology realizes that the reduction in incremental change of depletion width as a function of voltage can be compensated by corresponding increase in the optical field intensity within the newly depleted region, effectively linearizing the voltage versus phase shift response.

For example, in one implementation based on the disclosed technology, a linear optical phase modulator device can be structured to include a substrate and a PN junction formed on the substrate to include a P region, a N region and a depletion region formed by the P and N regions. In various practical implementations, the PN junction is formed in a structure that has one or more layers formed over the substrate, e.g., a silicon device layer on a substrate. An optical waveguide is formed on the substrate to guide light in one or more optical modes and the optical waveguide is structured or tailored to produce a spatial optical intensity distribution based on a free carrier density spatial distribution in the PN junction such that a voltage applied to the PN junction to modulate a phase of the light guided by the optical waveguide has a substantially linear relationship with the phase of the guided light. As such, the geometry and design of the optical waveguide are tailored to shape the spatial distribution of the guided light based on the specific nonlinear relationship between the width of the depletion region and the applied voltage at the PN junction to mitigate this nonlinearity for achieving the linear or substantially linear relationship in phase modulation based on the applied voltage. In implementations, the optical waveguide guide can be used to create a desired spatial optical distribution that may be, e.g., a single-mode light distribution or a spatial distribution by two or more optical modes.

In one implementation, a linear optical phase modulator device may include a substrate; and an optical waveguide formed of a silicon layer over the substrate, structured to include a PN junction having a P region and a N region across the silicon layer. The PN junction includes a depletion region primarily in the center of the optical waveguide formed by the P region and the N region of the PN junction, and the optical waveguide is configured to support a second order optical mode to have a first optical peak inside the P region and a second optical peak inside the N region to effectuate a linear phase modulation. The substrate may include $SiO_2$. The waveguide may be of a height of 250 nm, a slab height of 50 nm, and a width of 1200 nm.

In another implementation, a linear optical phase modulator device may include a substrate; and an optical waveguide formed of a silicon layer over the substrate, structured to include a PNPN junction formed of a PN-NP-PN junction in series across the silicon layer so as to form three depletion regions. The optical waveguide is structured to support a first order optical mode to have an elongated mode distribution along the PNPN junction to effectuate a linear optical phase modulation. The waveguide may be of a width of substantially 1200 nm. The concentration of dopants in the P and N regions may be of $1\times10^{18}$ $cm^{-3}$ and the concentration of dopants in the P- and N-regions includes $2\times10^{17}$ $cm^{-3}$.

In yet another implementation, a linear optical phase modulator device may include a substrate; and an optical waveguide formed of a silicon layer over the substrate, structured to include a PNPN junction formed of a PN-NP-PN junction in series across the silicon layer so as to form three depletion regions primarily toward the center of the waveguide. The waveguide is structured to support a third order optical mode to have three optical peaks located at the three junctions of the PNPN junction, respectively, to effectuate a linear phase modulation.

Exemplary linear optical phase modulator devices of the disclosed technology include an engineered positive derivative in the optical field to counteract the negative derivative of the depletion region. The positive spatial derivative is obtained by placing the PN junction at locations other than a peak of the optical field, for example, between the peaks of a higher order mode, where the optical field intensity F(x) increases as distance from the junction increases as shown in FIG. 1(c). This increase in the field intensity counteracts the decrease in the incremental change of the depletion region (i.e. negative derivative of $D(V_b)$), keeping the area under the curve constant. This results in a linear index versus voltage curve on the right.

Given a doping profile of a PN junction, the functional dependence of reverse bias voltage vs depletion width is fixed and the first derivative the functional dependence will always be negative, dictated by semiconductor physics. This is another way of stating that the increase in depletion width in a given change of voltage will decrease monotonically as reverse bias voltage increases. Because sign of the derivative of the depletion width with respect to reverse bias voltage is always negative, one must engineer the optical field intensity to increase proportionally as a function of distance away from the PN junction (e.g., a positive spatial derivative). In addition to the doping profile, or relative distribution of the dopants, the absolute dopant concentration determines the absolute magnitude of the width of the resulting depletion region at any given voltage. Therefore, a unique effective amount of doping concentration must be determined in combination with the appropriate optical mode profile in order for the resulting depletion region to optimally overlap with the optical mode at a given voltage for a linear response, as described further below.

A single mode waveguide supports, by definition, only the fundamental mode, which has its highest optical field intensity around the center of the waveguide and monotonically decreases towards the edge of the waveguide. This means that while linearization is possible, PN junction can only be placed towards the edges of the waveguide, limiting flexibility in design, possible degree of linearization, and manufacturing challenges. In addition, because depletion width extends equally to both sides of a PN junction in case of a symmetrically doped PN junction, one needs to dope either the P or N region (e.g., preferably P region because hole concentration changes the refractive index more effectively than N) closer to the center of the waveguide at a relatively low concentration compared to the outer doping region in order to force the depletion region to form primarily towards the center of the waveguide.

Higher order modes can be used to increase the degree of design freedom and further optimize the linearization performance. Higher order modes contain multiple nodes across the cross section of the waveguide, which provides positive spatial derivative of the optical field intensity when moving away from the center of the node, where PN junctions can be placed for optimum linearization. Another exemplary embodiment of the disclosed linear optical phase modulator devices utilizes a second order TE mode with symmetrically doped PN junction placed at the center of the waveguide, coinciding with the node of the second order mode. Symmetrically doped PN junction forms symmetric depletion region around the junction, which overlaps symmetrically with the symmetric optical mode profile around the node. This symmetricity aids in achieving best possible linearity, but non symmetric doping will also result in some degree of linearization as well. Fixing the PN junction location to the center of the waveguide to coincide with the node of the second order mode, one can change the width and height of the waveguide in order to change the mode profile, which changes the spatial derivative of the optical field intensity. This additional degree of freedom can be used to effectively counter the nonlinearity from the voltage to depletion width transfer function.

In addition, while the above description is in regards to PN junctions where the junction is formed across the horizontal direction in the cross section, the junction can also be fabricated vertically and the vertical gradient of the optical field can be used along with the vertical PN junction for same linearizing effect as described above.

This mode-depletion region linearizing overlap principle can also be extended to combination of different order modes to further optimize the linearization, and also to achieve more flexible tradeoff between degree of linearization and modulation efficiency. A non-limiting embodiment utilizes a combination of both fundamental mode and second order mode in a waveguide with a horizontal PN junction at the center of the waveguide, and by controlling the relative proportion between first and second order mode by controlled mode excitation, one can make the aforementioned tradeoff with flexibility.

Figure 2:
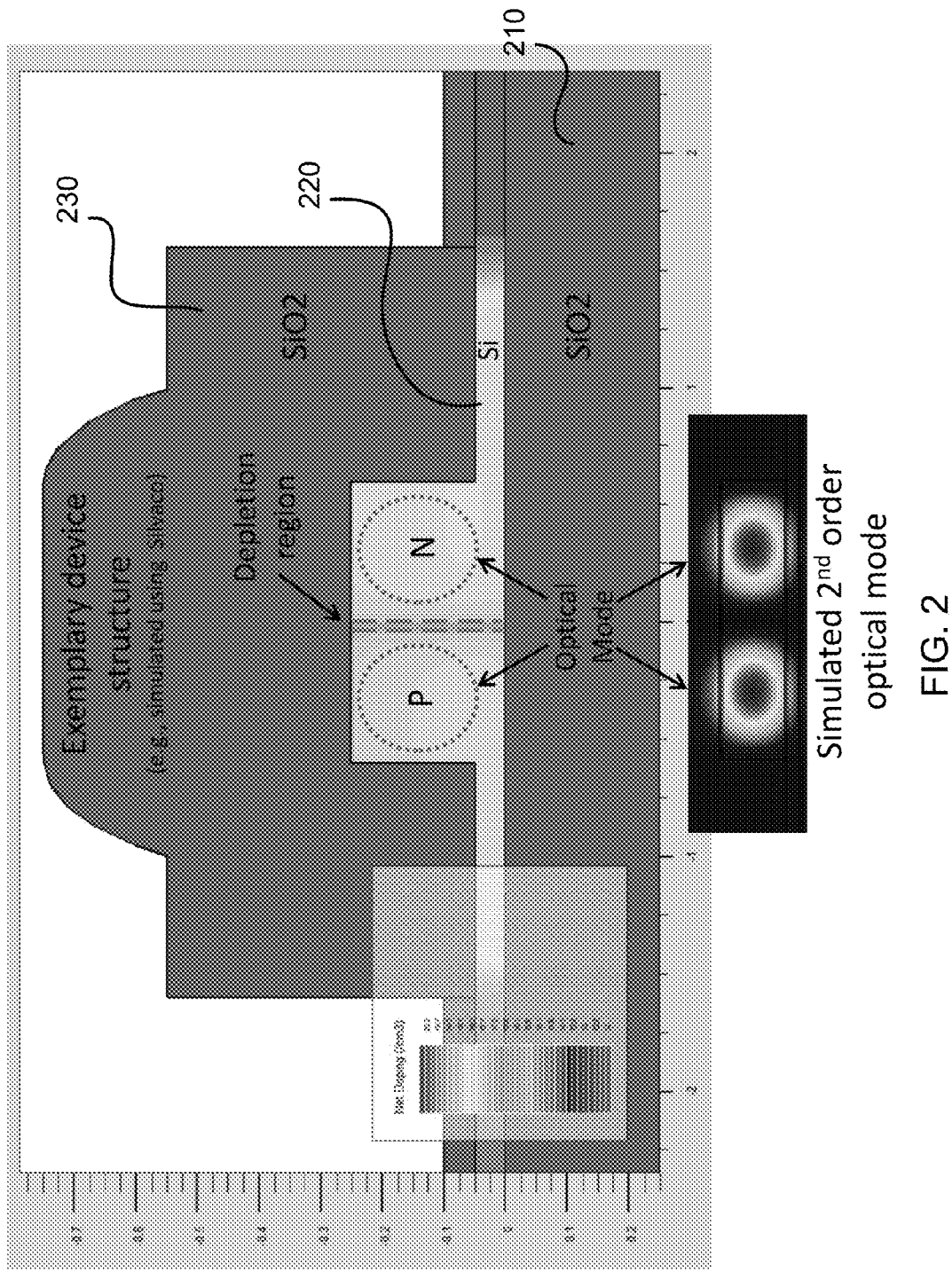
FIG. 2 shows a diagram of an exemplary linear optical phase modulator device for 2nd order optical mode linearization.

FIG. 2 shows a diagram of an exemplary linear optical phase modulator device for 2nd order optical mode. The exemplary device includes a substrate 210 (e.g., formed of or including $SiO_2$), a waveguide 220 formed of silicon over the substrate 210, and a waveguide cladding (e.g., formed of $SiO_2$) 230 formed over the waveguide 220. The PN junction is formed over the substrate 210 to include a P region and a N region and a depletion region formed by the P and N regions. The optical waveguide 220 in FIG. 2 is formed over the substrate and structured to guide light in one or more optical modes to have a spatial optical intensity distribution based on a free carrier density spatial distribution in the PN junction in such that the depletion region exhibit a substantially linear response with regard to a voltage applied to the PN junction to modulate a phase of the light guided by the optical waveguide. The optical waveguide is designed to support the 2nd order mode to achieve the desired spatial optical field distribution where the depletion region overlaps with a weak spot of the optical field of the optical waveguide and the optical field has two spatially separated peaks near the centers of the p and n regions, respectively.

FIG. 3 shows simulation results of the $2^{nd}$ order mode modulator device of FIG. 2. In particular, FIG. 3(a) shows the normalized change in effective index with regard to voltage and FIG. 3(b) shows the normalized first derivate with regard to voltage. For the simulation, as an example, the device can be configured to include a waveguide height of 250 nm, a slab height of 50 nm, and a width of 1200 nm.

Figure 4:
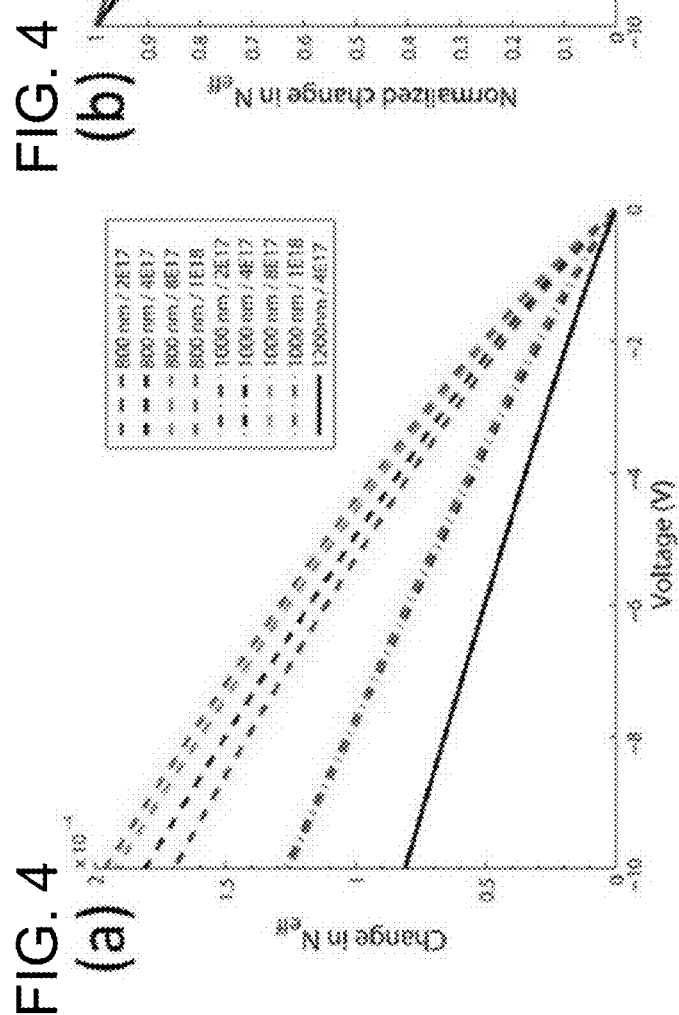
FIGS. 4(a) to 4(b) illustrate simulation results of an electro-optic transfer function of an exemplary linear optical modulator device.

Various simulations have been conducted with regard to linearity characteristics of an example linear modulator. FIG. 4 illustrates simulation results of the electro-optic transfer function of the exemplary linear modulator. FIG. 4(a) shows a simulated change in effective index for width of 800 nm, 1000 nm, and 1200 nm, with different doping concentrations and FIG. 4(b) shows a normalized change to show the effect of waveguide width on linearity. As shown in FIG. 4, a quasi-linear change in phase on voltage is achieved. The electro-optic transfer function was simulated using SILVACO for modeling fabrication and depletion region profile, coupled with COMSOL for optical eigenmode simulations. The dopant distribution in the waveguide cross-section using SILVACO was simulated, boron and phosphorous are implanted into a 250 nm thick silicon on oxide as p-type and n-type dopants, respectively, and then diffused. Further, the spatial distribution of free carriers within the waveguide was simulated over a range of applied voltages from 0V to −10V using SILVACO. The resulting distribution of carriers was converted to distribution of complex refractive indices using Sorer s equation, then translated into change in effective index versus voltage by solving for the eigenmodes. The effect of implantation dose, energy, width of the waveguide, and placement of junction within the waveguide is studied to optimize the linearity.

In many implementations, the waveguide width may be the primary determinant of the linearity of a linear modulator, while the doping concentration affects the modulation efficiency. For example, the waveguide width may be in the range of 800 nm to 1200 nm, and doping concentration may be in the range of $1\times10^{17}$ to $2\times10^{18}$ cm$^{-3}$ for phosphorous, with fixed doping ratio of 2:3 for P:N. In some implementations, the waveguide height also affects to the linearity of the linear modulator. In some implementations, the optical waveguide has a height of 200 nm to 500 nm. The two peaks of the TE1 mode of a narrower waveguide are more closely spaced, leading to greater overlap with the depletion region and higher modulation efficiency (FIG. 4(a), dashed lines). However, the mode profile of a 800 nm wide waveguide does not allow for optimal cancellation of depletion region's nonlinearity as seen in FIG. 4(b) (blue dashed line), although it is still a great improvement over the conventional modulator (red curve). By increasing the waveguide width to 1000 nm (FIG. 4(a), dotted dash lines), it is possible to reach the optimum point in linearity by trading off some modulation efficiency. The design has been optimized for best linearity, arriving at 1000 nm wide waveguide with the junction placed at the center of the waveguide with doping concentrations of $4\times10^{17}$ and $6\times10^{17}$ cm$^{-3}$ for phosphorous and boron, respectively.

FIG. 5 shows linearization dependence on doping concentration of an exemplary linear modulator. In FIG. 5, mode profile of the exemplary linear modulator is kept constant by using identical waveguide width of 1200 nm but doping concentration is changed.

In some implementations, the linear phase modulator can be implemented by using a linear amplitude modulator having a ring modulator configuration to facilitate accurate measurement of small changes in the effective index. The linearity of the modulator depends on the designed overlap of the TE1 mode with the depletion region, and the presence of other optical modes corrupts the transmission spectrum and degrades linearity. To mitigate potential mode coupling from the TE1 mode to undesired TE0 mode within the curved portions of a racetrack resonator, in some implementations, the bending radius are limited to 80 μm while implementing a wider, 1200 nm waveguide. This wider waveguide design still achieves linearity comparable to 1000 nm design but sacrifices modulation efficiency (FIG. 4, black curves). With this conservative design, it is possible to limit TE1 to TE0 mode coupling in simulation to less than 1%. In comparison, bending radius of 20 μm results in unacceptably high coupling greater than 10%. The junction is also shifted 50 nm towards the outside of the bend to account for the shifting of the mode in a bend. In order to selectively couple to the TE1 mode of the 1200 nm wide ring resonator, the bus waveguide at the coupling region is designed to be 562 nm wide to satisfy the phase matching condition. To facilitate evaluation of the improvement of the linear modulator with respect to a conventional modulator, a conventional PN junction modulator has been also fabricated in a 450 nm wide waveguide with 50 nm junction offset and identical doping concentrations.

In some implementations, the modulators are fabricated using a 248 nm DUV stepper in combination with electron beam lithography for the waveguides. As an example, a 100 mm SOI wafer is fabricated with 250 nm silicon device layer and 3000 nm buried oxide layer. In some implementations, waveguides are patterned with electron beam lithography and etched using ICP-RIE. All lithography steps following the waveguide definition may be performed using, for example, a 248 nm DUV stepper. In some implementations, 15 nm of ALD oxide is deposited to mitigate implant channeling, then a series of lithography and ion implantation steps are performed to define P++, N++, P, and N regions. Waveguide P and N regions are formed using Boron and Phosphorous, respectively. Following the implants, dopants are activated by RTA for 15 seconds at 1050° C., then clad with 1 t m of PECVD oxide. Vias and contacts are formed using sputtered $MoSi_2$, followed by metallization using sputtered Al and RIE etching. Fiber coupling facets are formed using the etched facet process. The fabricated device is shown in FIG. 6(a).

FIG. 6(a) shows a die micrograph of the fabricated linear modulator and FIG. 6(b) shows a transmission spectrum of the TE1 resonances of the fabricated ring modulator. Referring to FIG. 6(b), the lack of spurious resonances from other modes can be noted.

The experimental transmission spectrum of the multi-mode ring resonator modulator with 80 μm radius has been compared with that of the conventional single-mode modulator and comparable quality factors as high as 20,000 has been observed. The TE1 mode had an effective index of 2.67, and measured group index of 4.22. The resonances had an average loaded quality factor of ~20,000 and extinction ratio greater than 18 dB. The spectrum in FIG. 6(b) shows clean resonances of the TE1 mode without spectral corruptions from 1545 nm to 1555 nm. The clean TE1 resonances in 40 μm radius rings were also observed, but TE0 resonances were also visible, likely due to mode conversion resulting from abrupt straight waveguide to curved waveguide transition. In comparison, single mode ring modulators with a width of 450 nm showed a loaded quality factor of 24,000 with 15 dB extinction ratio and a group index of 4.02, which shows that the TE1 resonance of the 1200 nm wide ring resonator is comparable to the TE0 resonance of the 450 nm wide resonator.

Uniform resonance shifts have been observed across 10 V in the linear ring modulator. Ring resonators were used as a vehicle for accurately extracting small changes in the effective index, as changes in the resonant wavelength are directly proportional to the changes in effective index through the equation $\Delta\lambda/\lambda 0 = \Delta N_{\it{eff}}/Ng$. The resonance shifts of conventional ring modulators have been also measured as a function of voltage as a comparison and a monotonic decrease in the resonance shifts has been observed. The resonance spectra at different voltages has been plotted in FIG. 7. In particular, FIGS. 7(a) and 7(b) show spectra of ring resonances as a function of voltage for a conventional modulator and a linear modulator, respectively.

A significant improvement in the phase linearity from the linear modulator over the conventional modulator by 6.6 dB and 6.1 dB for second and third order nonlinearities, respectively, has been observed. Lorentzian fitting to the resonances has been performed and the resonant wavelengths have been extracted, and the formula above has been used to calculate the change in effective index as a function of voltage. The data from both devices were normalized to facilitate comparison, and plotted in FIG. 8(a). The normalization factor was 1.59E-4 and 9.94E-5 for the conventional and linear modulator, respectively. Good agreement between the simulation and experimental data in both devices has been observed. To quantify the improvement in linearity, a 9th order polynomial fit has been performed to the measured effective index versus voltage data and the Taylor expansion coefficients have been extracted as a function of voltage. Then, the second order and third order coefficient have been normalized with respect to the first order coefficient to account for difference in the efficiency, and a 6.6 dB and 6.1 dB improvements have been obtained in the second and third order nonlinearities, respectively.

A trade-off exists between modulation efficiency and bending radius due to the use of higher order optical mode. The demonstrated linear phase modulator trades off modulation efficiency to enable relatively tight bending radius of 80 μm for use in a racetrack resonator. The optimum linear phase modulator design for a straight waveguide can be achieved by simply decreasing the waveguide width to 1000 nm while maintaining the same doping profile, which increases the modal overlap with the depletion region. This optimum design increases the simulated modulation efficiency by more than 80% from the fabricated design, as shown in FIG. 8(b). This design has a maximum index modulation of 1.46E-4, which is competitive at 92% of the experimental efficiency of the conventional modulator. The optimum 1000 nm wide linear phase modulator can be implemented in any straight sections, including in a Mach-Zehnder modulator. Implementing this junction in one 1 mm long arm of a MZM modulator, we obtained simulated SFDR of 98.9 dB·Hz$^{2/3}$, using conditions of quadrature bias, 1 mW of optical power at a photodetector with 0.7 A/W responsivity, with noise floor of −165 dBm/Hz. The SFDR of the fabricated conventional modulator has been also simulated to be 94.6 dB·Hz$^{2/3}$, which is in good agreement with previous characterization of depletion mode MZM. Therefore, 5 dB improvement has been achieved in sub-octave SFDR over a conventional single arm MZM.

The linear phase modulator is significantly more tolerant to fabrication variation and misalignment than a conventional phase modulator. Misalignment sensitivity analysis of the linear phase modulator has been performed, the modulator performances for different misalignment scenarios of ±50 nm have been simulated with respect to the design point. The corner scenarios have been plotted in FIG. 9. In particular, FIGS. 9(a) and 9(b) illustrate simulated changes in effective index in different misalignment scenarios for conventional modulator and linear modulator, respectively.

Different scenarios resulted in variations between −1.6~+ 10.7%, skewed towards the positive range, resulting in slight increase of the modulation efficiency while retaining the linear characteristics. In comparison, conventional modulator subject to the same variation resulted in variations of −27.1~+3.7%, heavily skewed towards the negative range. This analysis shows that the sensitivity to misalignment of the linear phase modulator is almost 3 times less than that of the conventional modulator. This different behavior under misalignment conditions is due to the relative placement of the junction, where the conventional modulator is very sensitive to accurate placement of the junction at the narrow peak of the optical field. In contrast, the linear phase modulator is self-compensating to a degree due to the two lobes of the TE1 mode, because shift in the junction location increases the mode field intensity on one edge of the depletion region, counteracting the decrease in mode field intensity at the other edge.

Figure 10:
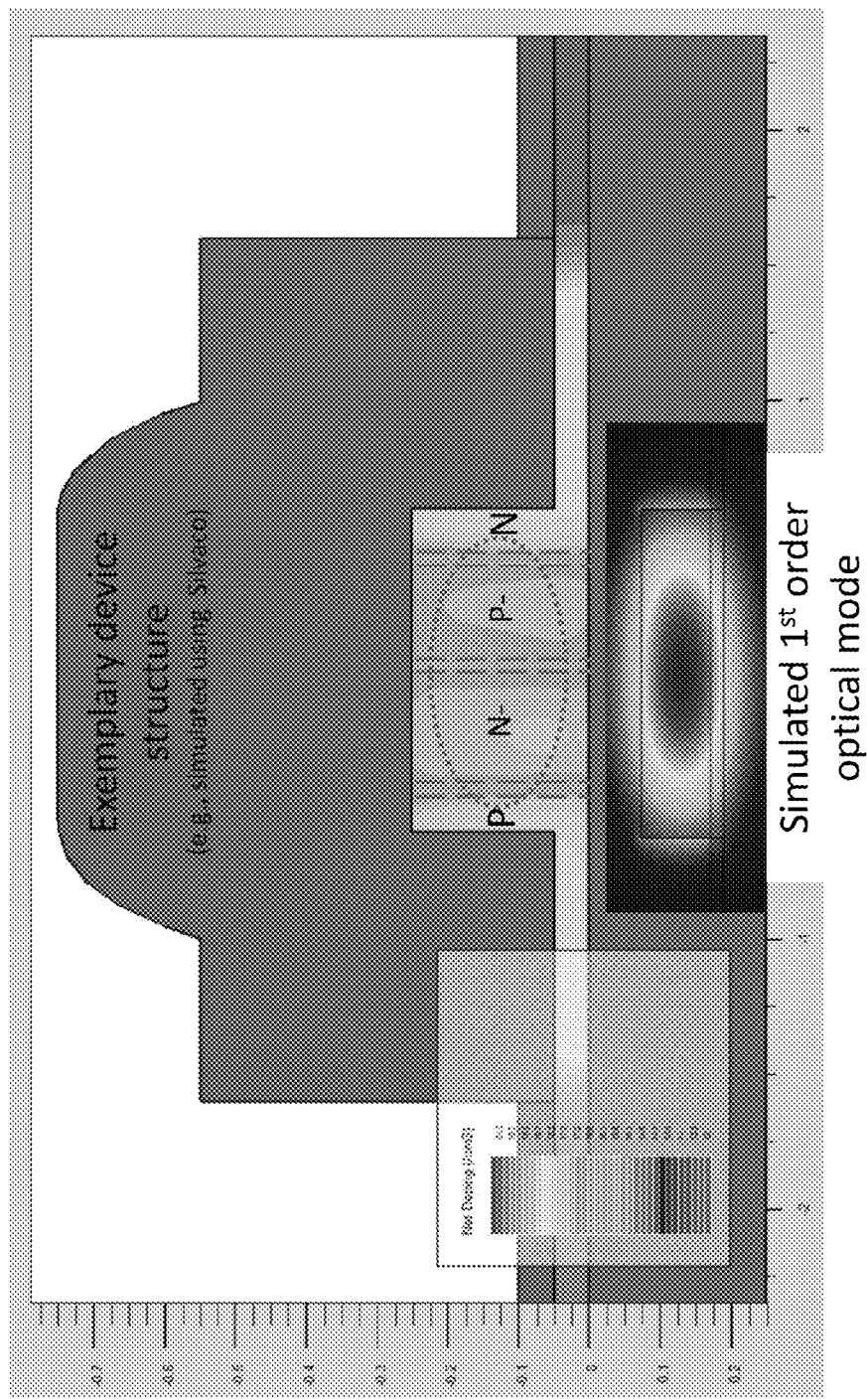
FIG. 10 shows a diagram of an exemplary linear optical phase modulator device for 1st order optical mode linearization.

FIG. 10 shows a diagram of an exemplary linear optical phase modulator device for the 1st order optical mode linearization. The exemplary device of FIG. 10 has the similar structures to FIG. 2 and differs from FIG. 2 in that the optical waveguide of FIG. 10 is designed to support the 1st order mode with an elongated spatial distribution along the PN-NP-PN junction to keep the middle NP junction un-modulated for the desired linearity. The waveguide is structured to include a PNPN junction across the silicon layer of the waveguide, in which the PNPN junction includes three depletion regions. The PNPN junction is formed of a PN-N-P-PN junction in series across the waveguide cross section, which provides symmetric modulation width change at the left and right depletion regions, while keeping the middle NP junction unmodulated for best linearity. In the PNPN junction, the P and N regions are doped much more then N- and P-regions, which causes the depletion region change to be dominant towards to center of the waveguide for proper linearization. FIG. 11 shows simulation results of the 1$^{st}$ order mode modulator device of FIG. 10. In particular, FIG. 11(a) shows the normalized change in effective index with regard to voltage and FIG. 11(b) shows the normalized first derivate with regard to voltage. For the simulation, as an example, the waveguide has a width of 1200 nm and doping concentrations of 1×10$^{18}$ cm$^{-3}$ for P and N regions and 2×10$^{18}$ cm$^{-3}$ for P- and N-regions.

Figure 12:
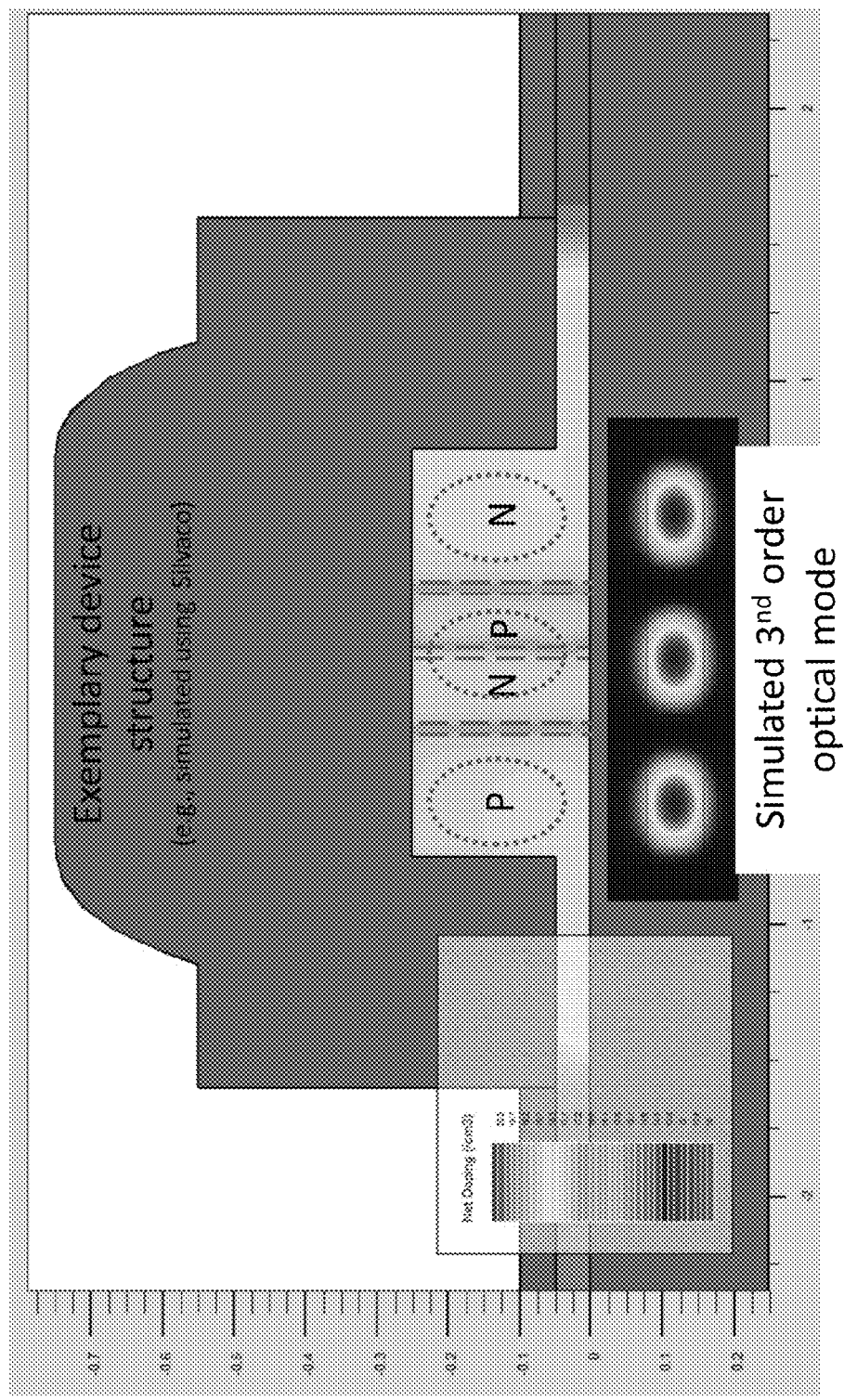
FIG. 12 shows a diagram of an exemplary linear optical phase modulator device for 3rd order optical mode linearization.

FIG. 12 shows a diagram of an exemplary linear optical phase modulator device for 3rd order optical mode linearization. The exemplary device of FIG. 12 has the similar structures to FIGS. 2 and 8 and differs from FIGS. 2 and 10 in that the optical waveguide of FIG. 12 is designed to support a 3rd order mode as shown to provide a desired 3rd order mode linearization. The waveguide is structured to include a PNPN junction, which includes PN-NP-PN junction in series across the waveguide cross section, to provide symmetric modulation width change at the left and right depletion regions, while keeping the middle NP junction unmodulated for best linearity. The PNPN junction includes three depletion regions primarily toward the center of the waveguide formed by a lower concentration of dopants in a center portion of PNPN junction and a greater concentration of dopants in an outer portion of the outer P region and the outer N region of the PNPN junction. FIG. 13 shows simulation results of the 3rd order mode modulator device of FIG. 11. In particular, FIG. 13(a) shows the normalized change in effective index with regard to voltage and FIG. 13(b) shows the normalized first derivate with regard to voltage. For the simulation, as an example, the waveguide has a width of 1500 nm and doping concentrations of $1\times10^{18}$ cm$^{-3}$ for P and N regions Various implementations of the disclosed technology enable linear voltage to phase modulation in silicon waveguide modulators. This will enable high performance modulators for analog photonics applications that can be integrated in a silicon platform, paving the way for integration of high performance analog photonic devices with the electronic frontend.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed are techniques and structures as described and shown, including:

1. A linear optical phase modulator device, comprising:
   a substrate;
   a PN junction formed on the substrate to include a P region, a N region and a depletion region formed by the P and N regions; and
   an optical waveguide formed on the substrate and structured to guide light in one or more optical modes to have a spatial optical intensity distribution based on a free carrier density spatial distribution in the PN junction, the optical waveguide structured to allow a second order optical mode to have a first optical peak inside the P region and a second optical peak inside the N region such that a voltage applied to the PN junction to modulate a phase of the light guided by the optical waveguide has a linear relationship with the phase of the light.

2. The device of claim 1, wherein the optical waveguide has an optical field intensity which increases as distance from the junction increases.

3. The device of claim 1, wherein the PN junction is located between peaks of an optical field.

4. The device of claim 1, wherein the optical waveguide has a width of 800 nm to 1500 nm.

5. The device of claim 1, wherein the optical waveguide has a height of 200 nm to 500 nm.

6. The device of claim 1, wherein the linearity of the device depends on a waveguide width and doping concentrations of the P region and the N region.

7. The device of claim 1, wherein the P region and N region include boron and phosphorous.

* * * * *

UNITED STATES PATENT AND TRADEMARK OFFICE
CERTIFICATE OF CORRECTION

PATENT NO.         : 10,216,016 B2
APPLICATION NO.    : 14/810444
DATED              : February 26, 2019
INVENTOR(S)        : Yoon Ho Lee et al.

Page 1 of 1

It is certified that error appears in the above-identified patent and that said Letters Patent is hereby corrected as shown below:

In the Specification

1. In Column 4, Lines 12-13, delete "Sin ^2(phi)" and insert -- Sin^2(phi) --, therefor.

2. In Column 9, Line 43, delete "Sorer s" and insert -- Soref's --, therefor.

3. In Column 10, Line 54, delete "1 t m" and insert -- 1 μm --, therefor.

4. In Column 11, Line 12, delete "of 24,000" and insert -- of ~24,000 --, therefor.

5. In Column 13, Line 19, delete "regions" and insert -- regions. --, therefor.

Signed and Sealed this
Seventeenth Day of September, 2019

Andrei Iancu
*Director of the United States Patent and Trademark Office*